United States Patent Office 2,988,570
Patented June 13, 1961

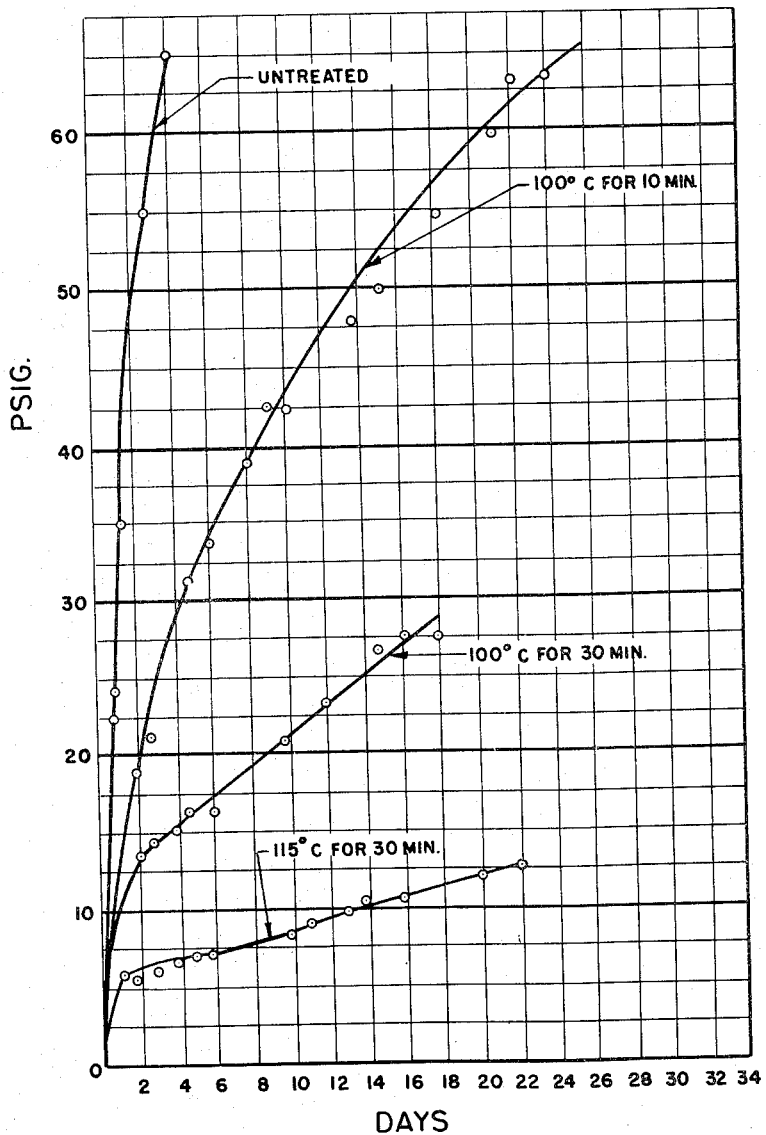

2,988,570
STABILIZATION OF LIQUID REACTION PRODUCTS OF DIBORANE AND OLEFIN HYDROCARBONS
Hugo Stange, Niagara Falls, N.Y., assignor, by mesne assignments, to Olin Mathieson Chemical Corporation, a corporation of Virginia
Filed May 15, 1956, Ser. No. 585,124
2 Claims. (Cl. 260—606.5)

This invention relates to the stabilization of liquid borohydrocarbons produced by reacting diborane and an olefin hydrocarbon having 2 to 4 carbon atoms.

The production of liquid borohydrocarbons has been previously proposed by the reaction of diborane and unsaturated hydrocarbons in the gaseous phase and in admixture with an inert diluent gas at temperatures elevated by direct or indirect heat exchange. Such liquid borohydrocarbons have high heats of combustion and are useful as high energy fuels when burned with air, for example, as described in application Serial No. 533,944, filed September 13, 1955, in the names of Earl A. Weilmuenster and Joel A. Zaslowsky. In addition to having high heats of combustion, however, high energy fuels should be characterized by, for example, low vapor pressure, low viscosity, slight tendency to be pyrophoric, low toxicity, low freezing point and good storage stability. Although the liquid borohydrocarbons produced by the reaction of diborane and unsaturated hydrocarbons described above have satisfactory storage stability, it has now been found that certain of these liquid borohydrocarbons, particularly those produced by the reaction of diborane and olefin hydrocarbons having from 2 to 4 carbon atoms, for example, ethylene, propylene and butylene, can be further stabilized with respect to vapor pressure without undue change in other properties by heat treatment under particular conditions of temperature and time.

Thus, according to the method of this invention, liquid reaction products of diborane and olefin hydrocarbons having 2 to 4 carbon atoms are stabilized with respect to vapor pressure by heating such reaction products at a temperature of 100 to 130° C. for from 10 to 40 minutes.

The invention is further illustrated by the following example:

EXAMPLE I

Part 1

A mixture of hydrogen and diborane is reacted with a mixture of hydrogen and propylene. The apparatus employed comprises an elongated jacketed reaction chamber having a longitudinally situated heating coil in the center thereof. The heating coil and jacket are connected in series and mineral oil at 198–202° C. is circulated through the system. The temperature inside the reactor is measured by a thermocouple located in a glass well near the bottom of the reactor. Hydrogen and propylene at the rate of 640 and 80 ml. per minute respectively are mixed in one feed line before entering the reaction zone. Hydrogen and diborane at the rate of 160 and 800 ml. per minute respectively are mixed in a separate feed line. The feed stream containing the propylene is discharged through a fritted disc at the top of the heated zone of the reactor. The stream containing the diborane is discharged at the top of the heated reaction zone. A gas sampler is located at the reactor exit in order to sample the gaseous product before it is condensed.

The gases, including the reaction products, are passed through a trap at room temperature, a spiral trap cooled to −78° C., and finally through a Nujol safety vent. A dense white fog is observed after one minute in the trap at room temperature. The exit gases are further passed for a 10 minute period through ethyl alcohol in a flask connected to a water-cooled condenser and then through a trap containing ethyl alcohol cooled to −78° C. The unreacted gases are released through a Nujol safety vent.

After the reaction is terminated, the liquid products collected in the trap cooled to −78° C. are allowed to warm to room temperature and the volatile gases allowed to escape through a Nujol safety vent.

In a second run, the reactor is packed with a ¼ inch by ¼ inch protruded nickel packing.

The pertinent data with respect to these two runs are set out in Table I below.

TABLE I

| Run | $H_2/B_2H_6$ ml./min. | $C_3H_6/H_2$ ml./min. | Overall Ratio $H_2/B_2H_6/C_3H_6$ | °C. Temp. | Conversion, percent | Wt. of product, g. | Boron in Product, percent | Time of Run, min. |
|---|---|---|---|---|---|---|---|---|
| 1 | 160/800 | 80/640 | 10/10/1 | 195–199 | 44 | 22.8 | 51.5 | 89 |
| 2 | 160/800 | 80/640 | 10/10/1 | 198–201 | 40 | 49.5 | 52.3 | 150 |

Part 2

The liquid products of Part 1 are then stabilized.

The apparatus employed comprises a 100 ml. round-bottomed flask equipped with a vacuum stop-cock and connected to a methanol-cooled reflux condenser. The methanol is circulated at −78° C. A U-trap cooled to −96° C. is placed in series with the condenser. An oil bath held at constant temperature is used as a heat source.

Approximately 8 ml. (6.8 g.) of the liquid product obtained in run 1 of Part 1 is introduced into the reaction flask in an inert atmosphere. The flask and contents are cooled to −196° C. before attaching the flask to the rest of the system which has previously been purged with nitrogen. The oil bath at 100° C. is raised slowly around the flask after the flask has warmed to room temperature. After 10 minutes the bath is removed and the flask is allowed to cool in the air to room temperature. The flask and its contents are cooled to −196° C. before it is detached from the system in an inert-atmosphere box. The non-volatile portion remaining in the reaction flask is subjected to stability and other testing, the results of which are set out in Table II below and in the accompanying figure together with the results of tests on other portions of liquid products of Part 1 similarly heat treated under the temperature and time conditions set out in Table II.

TABLE II.—MASS SPECTRA OF PROPYLENE-DIBORANE REACTION PRODUCTS [1]

| Product From Run | Treatment | Propyldiboranes | | Pentaborane (9) | Propylpentaborane (9) | Propyl diborane | Deca borane | Propyldocaborane | Dipropyldecaborane | Tripropyldecaborane |
|---|---|---|---|---|---|---|---|---|---|---|
| | | 41 | 43 | 60 | 90 | 97 | 117 | 156 | 205 | 246 |
| 1 | Untreated | 22.63 | 8.00 | 18.35 | 2.81 | 4.17 | 1.50 | 0.66 | 0.30 | 0.10 |
| 1 | 100° C. for 10 min. | 26.79 | 5.44 | 18.35 | 2.52 | 4.95 | 1.18 | 0.65 | 0.23 | 0.08 |
| 1 | 100° C. for 30 min. | 34.94 | 7.40 | 18.35 | 3.92 | 9.41 | 1.81 | 1.22 | 0.52 | 0.21 |
| 2 | Untreated | 19.17 | 4.43 | 18.35 | 1.36 | 1.76 | 0.62 | 0.11 | 0.013 | |
| 2 | 115° C. for 30 min. | 0.02 | 3.39 | 18.35 | 1.96 | 2.04 | 2.18 | 0.32 | 0.11 | |

[1] All spectra were resolved to 18.35 for the major pentaborane(9) peak of .00.

The stability studies are carried out by introducing a 4 ml. sample into a 10 ml. stainless steel Hoke cylinder equipped with a Marsh gauge (60 lb. p.s.i.g. maximum). The pressure rise over various periods of time is observed and recorded.

A measure of the stability of the non-volatile portion of the propylene-diborane reaction product is its change in pressure with time. As shown in the accompanying figure, the stability of the products increases markedly with heat treatment and particularly stable products are obtained by heat treatments at 115° C. for 30 minutes.

According to the mass spectrometric data presented in Table II, the heat treatment increases slightly the concentration of higher boranes and their propyl derivatives.

Although the heat-treatment process of this invention has been described with respect to the particular diborane-propylene reaction products of Example I, the process of this invention is applicable to such reaction products produced according to less limited ranges of reaction conditions. For example, the temperatures employed may range from about 100° C. to 250° C. The relative amounts of diborane and olefine hydrocarbons used can be varied widely, the molar ratio of diborane to olefin hydrocarbon being within the range from 0.5:1 to 10:1. The amounts of diluent gas such as hydrogen, nitrogen, argon, or mixtures thereof, can also be varied widely, the amount to introduced in practice being dependent upon the amount of diluent required to effect essential mixing and heat transfer necessary for any particular mode of operation. In general, the gases entering the reaction system (diborane, olefin hydrocarbon and diluent gas) will be composed of from about 20 to 90 percent by volume of diluent gas. Instead of the indirect heat exchange system described in Example I for initiating and maintaining the appropriate reaction temperature, a direct heat exchange system may be employed such as, for example, a mass of mercury through which the reactant gases are passed.

I claim:

1. A method for the stabilization with respect to vapor pressure of liquid reaction products of diborane and an olefin hydrocarbon having from 2 to 4 carbon atoms which comprises heating a reaction mixture consisting of such reaction products at 100 to 130° C. for from 10 to 40 minutes.

2. A method for the stabilization with respect to vapor pressure of liquid reaction products of diborane and propylene which comprises heating a reaction mixture consisting of such reaction products at 100 to 130° C. for from 10 to 40 minutes.

References Cited in the file of this patent

Hurd: "American Chemical Society Journal," vol. 70 (1948), page 2053.